United States Patent [19]

Dinlocker

[11] 4,016,535
[45] Apr. 5, 1977

[54] TILT ALARM FOR TRACTOR VEHICLE OR THE LIKE

[75] Inventor: Robert I. Dinlocker, Lansdale, Pa.

[73] Assignee: Sheller-Globe Corporation, Toledo, Ohio

[22] Filed: Dec. 15, 1975

[21] Appl. No.: 640,972

[52] U.S. Cl. .............................. 340/52 H; 180/104; 200/61.52; 200/61.45 M
[51] Int. Cl.² ......................................... G08B 21/00
[58] Field of Search ............. 340/52 H, 262, 267 R, 340/267 C, 282; 200/61.45 R, 61.45 M, 61.52; 180/104

[56] References Cited

UNITED STATES PATENTS 2,772,411  11/1956  Cooper ..................... 340/267 C X
3,548,400  12/1970  Boyd et al. ......................... 340/282

Primary Examiner—Alvin H. Waring
Attorney, Agent, or Firm—Harness, Dickey & Pierce

[57] ABSTRACT

In a tractor like vehicle a new tilt alarm device which operates to warn the vehicle operator when the vehicle becomes tilted beyond a predetermined desired angle of warning.

13 Claims, 5 Drawing Figures

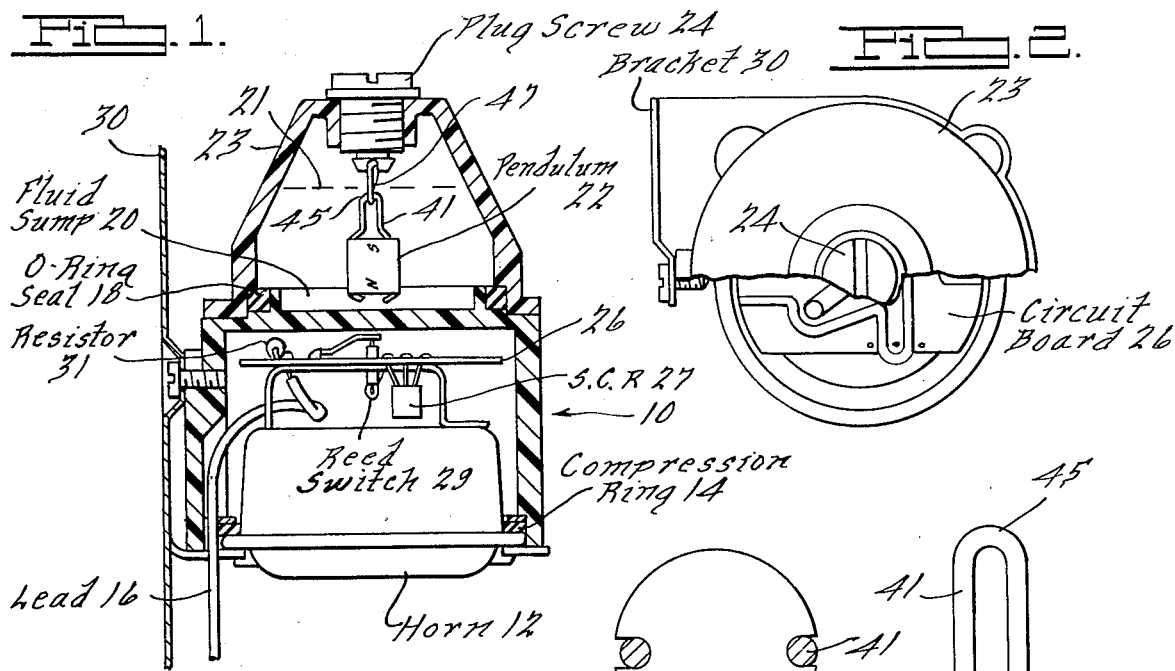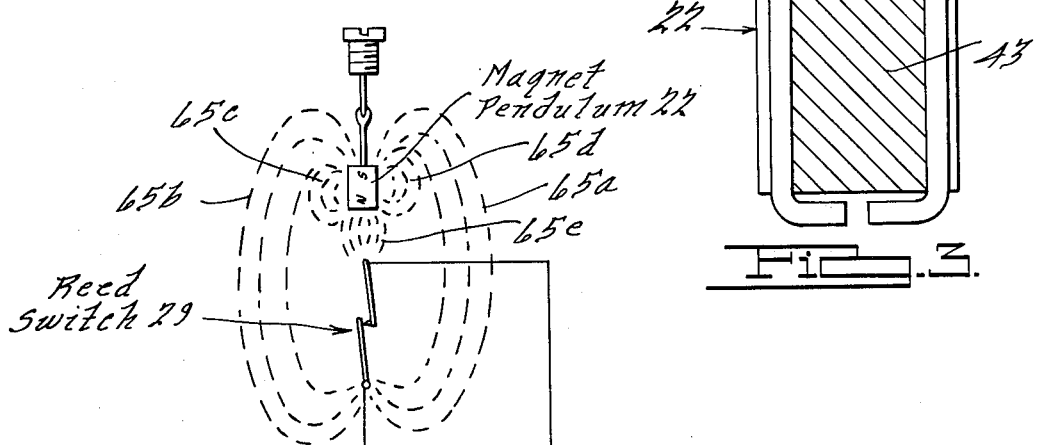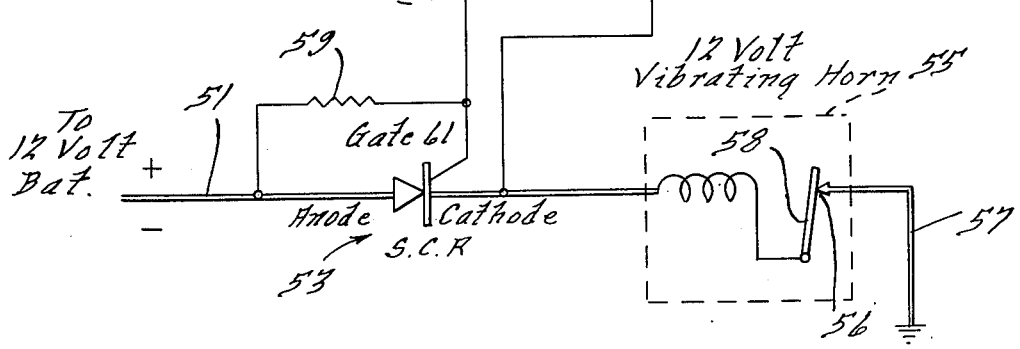

TILT ALARM FOR TRACTOR VEHICLE OR THE LIKE

BRIEF DESCRIPTION OF THE INVENTION

This invention broadly relates to a new tilt alarm device for tractor vehicles and the like.

The state of the art is indicated by the following references: U.S. Pat. Nos.: Hierta 3,601,729; Brooks et al., 3,564,496; Heath, 1,085,608; Segoni, 2,794,084; Challman, 2,759,056; Claypool, 2,453,783; Bigelow, 1,915,267; Hughes, 3,599,745; Wilson, 2,692,652; Johns et al., 3,778,763; Henderson et al., 3,833,084; Phillips, 2,917,126; Barnes, 3,671,933; Quang-Hsi Hu, 3,098,538; Sartor, 3,798,593; Funk, 3,798,594; Dodd et al., 3,772,643; Burnett, 3,703,617; Richardson, 2,783,321; Smith, 2,204,735; Didsbury, Sr., 3,002,487; Milutin, 1,368,279; Myers, 3,729,602.

One object of the invention is to provide for tractor vehicles and the like a new and special tilt alarm device which warns the vehicle operator when the vehicle becomes tilted beyond a predetermined warning angle.

Another object of the invention is to provide in a tractor like vehicle construction the improvement of a special tilt alarm means for warning the operator when the vehicle becomes excessively tilted.

Another object of the present invention is to provide a special tilt alarm means which is operative in essentially all directions.

Another object of the present invention is to provide a new tilt alarm wherein a special electrical circuit is utilized.

Another object of the present invention is to provide a new tilt alarm device having a special electrical circuit means which includes a swinging pendulum magnet, a vertically mounted reed switch, and an S.C.R. (silicon controlled rectifier) transistor means.

Other objects, features and advantages of the present invention will become apparent from the subsequent description and the appended claims taken in conjunction with the accompanying drawings.

BRIEF DESCRIPTION OF THE DRAWINGS

FIG. 1 illustrates an assembly drawing, in cut-away form, of the preferred tilt alarm construction in accordance with this invention;

FIG. 2 illustrates a top view in partially cut-away form of FIG. 1;

FIG. 3 illustrates a detailed view of the pendulum magnet used in the construction of FIG. 1;

FIG. 4 illustrates a bottom view of FIG. 3; and,

FIG. 5 illustrates in schematic form a diagram of the preferred electrical circuit for use in accordance with this invention.

SUMMARY OF THE INVENTION

Briefly stated, it has been discovered that a unique tilt alarm device which is economical to manufacture and very practical in actual usage can be constructed by utilizing a fluid dampened swinging pendulum magnet to actuate a special electrical circuit which includes a vertically mounted reed switch, wherein the reed switch is activated when the magnet swings away from its normal orientation, upon the vehicle becoming tilted beyond a desired warning angle. When the reed switch is activated this causes a warning horn to sound thus indicating to the vehicle operator that the vehicle is excessively tilted.

In another aspect, briefly stated, this invention concerns an improvement in tractor like vehicles suitable for use on lawns, gardens and the like, and including motive means for driving the tractor like vehicle, wherein the improved construction comprises a special tilt alarm means for warning the operator when the vehicle is tilted in any direction beyond a predetermined desired angle of warning, said tilt alarm means including, mounting and housing means for supporting the tilt alarm on the vehicle, a swinging pendulum magnet means operative in generally any direction upon swinging a predetermined amount away from its normal disposition to cause actuation of the tilt alarm, damping fluid means around said swinging means for damping the movement of the swinging means to guard against premature actuation, warning indicator means for providing a warning to said operator upon said actuation caused by the swinging means, electrical circuit means for operatively interconnecting the swinging means and the warning indicator means to enable actuation of said indicator means when said swinging means swings said predetermined amount away from its normal disposition, said circuit means including a reed switch means generally oriented vertically such that the longitudinal axis of the reed switch and the swinging means are generally in line with one another, said reed switch means being activated when said swinging means swings said predetermined amount away from its normal disposition to thereby actuate said indicator means.

In accordance with this invention the actuation of the tilt alarm can be made to occur at essentially any predetermined desired warning angle, however, normally the tilt alarm in accordance with the invention is constructed to give warning when the vehicle becomes tilted from the horizontal more than about 20°. Preferably the tilt alarm is constructed such that it will be activated when the vehicle becomes tilted from the horizontal more than about 20°–30°.

DESCRIPTION OF THE PREFERRED EMBODIMENTS

The views of FIGS. 1, 2, 3 and 4 illustrate a preferred construction for a tilt alarm generally designated 10 in accordance with the invention. The tilt alarm 10 includes a horn 12, a compression ring 14, lead wire 16, an O-ring seal 18, fluid sump area 20, pendulum 22, and plug screw 24.

FIGS. 1 and 2 also illustrate the circuit board 26, which includes an S.C.R. transistor means 27, reed switch 29, and resistor 31. The electrical circuit means for use in the tilt alarm 10 will be discussed in more detail hereinafter.

The fluid sump 20 holds a relatively viscous damping fluid designated 21. Preferably the damping fluid is a material such as a relatively viscous silicone fluid. The damping fluid acts to carry out a damping function with respect to the swinging pendulum magnet 22. The damping fluid is held within the chamber formed by the top or cap member 23. The tilt alarm 10 is mounted on the vehicle with which it is to be used by means of a bracket member 30.

FIGS. 3 and 4 show the pendulum magnet 22 in more detailed form. The magnet 22 is supported for pendulum type movement by the holding wire 41 which is sprung into place around the magnet body 43. The holding wire 41 has a curved loop area 45 at the top thereof which interconnects with a downwardly oriented wire loop 47 which is supported from the plug screw 24 (see FIG. 1). This supporting structure for the pendulum magnet 22 allows that it will swing freely in any direction for 360° orientation. Thus no matter in which direction the vehicle becomes tilted, if the tilting is excessive beyond the predetermined desired angle of warning, then the movement of the magnet away from its normal vertical orientation above the reed switch 29 will cause the activation of the reed switch 29 which thus activates the warning horn 12. This will be explained in more detail hereinbelow.

The operation of the electrical circuit in accordance with the invention is best seen in FIG. 5. The load path 51 from a DC power source, such as a 12-volt battery not shown, with the load path 51 coming from the battery positive through the S.C.R. designated 53, and the vibrating horn schematically designated 55 to ground 57, is blocked by the gated S.C.R. 53 (e.g., General Electric Type C-103). A resistor designated 59, such as a 10,000 ohm resistor, leaks a small but sufficient current from the battery positive to open the gate designated 61 but it is bled off by the shunting path 63 through the reed switch 29. When the pendulum magnet 22 weakens the flux path designated by the numerals 65a, 65b, 65c, 65d and 65e through moving away from its normal dead center orientation, the reed switch 29 opens causing the S.C.R. 53 to fire. This state will remain until the horn contacts 56 open within the horn 55.

The tilt alarm in accordance with this invention is operable for use on essentially any vehicle such as a tractor vehicle, lawn mower, tractor, or the like, which has a DC battery system of 12 volts, and of course the tilt alarm would be operable for other voltage systems such as a six-volt system etc. as desired. The tilt alarm in accordance with the invention is highly advantageous and unique in that it has equal operation in any plane that the vehicle might be tilted in. Normally the tilt alarm is constructed such that it will sound off when the vehicle is tilted approximately 30° from the horizontal. The degree of tilt angle can be varied during production of the tilt alarm but the tilt angle will always be essentially the same in all directions. The time constant as referred to herein is the time it takes the horn to sound after the device has been constantly tilted to the predetermined desired warning angle. Using the viscous fluid damping material 21 it is possible to prevent false signals from being emitted due to normal vibration or shaking of the vehicle during operation. The damping fluid also prevents damage to the construction which might otherwise be caused by the constant vibration of the vehicle.

Since the tilt alarm is generally only needed when the vehicle is being operated and in motion it has been found that the feed wire can be connected to the coil side of the ignition switch on the vehicle and this arrangement thereby puts the ignition switch in control over the tilt alarm horn without subjecting the system to an extra switch which could be forgotten by the operator. This thereby prevents current drain from the battery. The tilt alarm normally draws a minute amount of standby current from the battery when the vehicle is being operated. This normally amounts to only about one thousandth of an ampere. When the tilt alarm is sounded the current drain rises to approximately 80 milliamperes. Since the tilt alarm has magnetic components which can be affected by strong external fields, it is therefore preferred that the tilt alarm be mounted away from magnetos, ignition coils, starting mowers, or other powerful magnetic devices.

A particularly important feature of this invention is the fact that an S.C.R. transistor means controlling load in a direct current circuit is unique. An S.C.R. is a very common alternating current device but generally it cannot be used in D.C. circuits because it cannot be turned off once it is turned on. There are cases where S.C.R. devices are used in D.C. circuits to control motors such as on fork lifts, trucks, etc. These devices however have had pulse generators to cause a peak reverse discharge from a capacitor which unfires the S.C.R. This however is a complicated process and cannot practically be used for the manufacture of a tilt alarm such as in the present invention. In the electrical circuit of this invention the reed switch would normally not carry the load of the horn for more than a few beeps. However, the S.C.R. has been found to overcome this problem, but also, normally one could not use an S.C.R. in a D.C. circuit device because the S.C.R. will normally stay closed unless it is de-activated by something opening the main circuit again. This is uniquely accomplished in the present invention by the horn itself which is constantly interrupting the circuit as its armature 58 vibrates back and forth, and therefore the horn de-energizes the S.C.R.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. In a tractor like vehicle, suitable for use on lawns, gardens and the like, and including motive means for driving the tractor like vehicle by a person operating same, the improvement comprising a special tilt alarm means for warning the operator when the vehicle is tilted in any direction beyond a predetermined desired angle of warning, said tilt alarm means including, mounting and housing means for supporting the tilt alarm on the vehicle, a swinging pendulum magnet means operative in generally any direction, upon swinging a predetermined amount away from its normal disposition, to cause actuation of the tilt alarm, viscous damping fluid means, around said swinging means, for damping the movement of the swinging means to guard against premature actuation, said fluid means being non-mercury, warning indicator means for providing a warning to said operator upon said actuation caused by the swinging means, electrical circuit means for operatively interconnecting the swinging means and the warning indicator means to enable actuation of said indicator means when said swinging means swings said predetermined amount away from its normal disposition, said circuit means including a reed switch means generally oriented vertically such that the longitudinal axis of the reed switch and the swinging means are generally in line with one another, said reed switch means being activated when said swinging means swings said predetermined amount away from its normal disposition to thereby actuate said indicator means.

2. The invention of claim 1 wherein, said actuation occurs when the vehicle becomes tilted from horizontal more than about 20°.

3. The invention of claim 2 wherein, said electrical circuit means is powered by a direct current source, and said indicator means is a horn.

4. The invention of claim 3 wherein, said circuit means also includes an SCR transistor means, of the silicon controlled rectifier type, operative to compensate for any overloading of the circuit means within the reed switch portion thereof.

5. The invention of claim 1 wherein, said actuation occurs when the vehicle becomes tilted from horizontal more than about 20°–30°.

6. The invention of claim 4 wherein, a feed wire for the electrical circuit means is connected to a coil side of an ignition switch on the vehicle so that the tilt alarm is automatically turned off when the ignition switch is turned off.

7. In a tractor like vehicle, suitable for use on lawns, gardens and the like, and including motive means for driving the tractor like vehicle by a person operating same, the improvement comprising a special tilt alarm means for warning the operator when the vehicle is tilted in any direction beyond a predetermined desired angle of warning, said tilt alarm means including, mounting and housing means for supporting the tilt alarm on the vehicle, a swinging pendulum means operative in generally any direction, upon swinging a predetermined amount away from its normal disposition, to cause actuation of the tilt alarm, viscous fluid damping means, around said swinging means, for damping the movement of the swinging means to guard against premature actuation, warning indicator means for providing a warning to said operator upon said actuation caused by the swinging means, electrical circuit means for operatively interconnecting the swinging means and the warning indicator means to enable actuation of said indicator means when said swinging means swings said predetermined amount away from its normal disposition, said circuit means including a reed switch means, said reed switch means being activated when said swinging means swings said predetermined amount away from its normal disposition to thereby actuate said indicator means.

8. In a tractor like vehicle, suitable for use on lawns, gardens and the like, and including motive means for driving the tractor like vehicle by a person operating same, the improvement comprising a special tilt alarm means for warning the operator when the vehicle is tilted in any direction beyond a predetermined desired angle of warning, said tilt alarm means including, electrical circuit means for actuating the alarm means and said circuit means comprising, a pendulum supported magnet means supported generally vertically above a reed switch means and operative upon swinging away from alignment with said reed switch means to cause actuation of a horn means which gives warning to the operator that the vehicle is tilted beyond said predetermined desired angle.

9. The invention of claim 8 wherein, said circuit means includes an SCR transistor means of the silicon controlled rectifier type operative to compensate for any overloading of the circuit means within the reed switch means portion thereof.

10. The invention of claim 8 wherein, said actuation occurs when the vehicle becomes tilted from horizontal more than about 20°–30°.

11. The invention of claim 9 wherein, said actuation occurs when the vehicle becomes tilted from horizontal more than about 20°–30°.

12. The invention of claim 8 wherein, a feed wire for the electrical circuit means is connected to a coil side of an ignition switch on the vehicle so that the tilt alarm is automatically turned off when the ignition switch is turned off.

13. The invention of claim 9 wherein, a feed wire for the electrical circuit means is connected to a coil side of an ignition switch on the vehicle so that the tilt alarm is automatically turned off when the ignition switch is turned off.

* * * * *